(12) United States Patent
Brace et al.

(10) Patent No.: US 7,921,304 B2
(45) Date of Patent: Apr. 5, 2011

(54) SECURING DATA SET IMAGES

(75) Inventors: Colin H. Brace, Seattle, WA (US);
Nathan D. Muggli, Kirkland, WA (US);
William B. Lees, Redmond, WA (US);
William J. Whalen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/294,977

(22) Filed: Dec. 6, 2005

(65) Prior Publication Data

US 2007/0130615 A1    Jun. 7, 2007

(51) Int. Cl.
*G06F 21/24* (2006.01)
(52) U.S. Cl. .................. 713/193; 380/277; 380/284
(58) Field of Classification Search .......... 713/165, 713/193; 726/4; 380/277, 284
See application file for complete search history.

(56) References Cited

U.S. PATENT DOCUMENTS

| | | | |
|---|---|---|---|
| 5,940,507 A | 8/1999 | Cane et al. | |
| 6,170,058 B1 | 1/2001 | Kausik | |
| 6,249,866 B1* | 6/2001 | Brundrett et al. | 713/165 |
| 6,427,140 B1* | 7/2002 | Ginter et al. | 705/80 |
| 6,560,719 B1 | 5/2003 | Pham et al. | |
| 6,574,733 B1 | 6/2003 | Langford | |
| 6,754,827 B1 | 6/2004 | Cane et al. | |
| 6,820,136 B1 | 11/2004 | Pham et al. | |
| 2001/0044910 A1* | 11/2001 | Ricart et al. | 714/6 |
| 2003/0046366 A1* | 3/2003 | Pardikar et al. | 709/219 |
| 2004/0098426 A1 | 5/2004 | Ishii et al. | |
| 2004/0146163 A1 | 7/2004 | Asokan et al. | |
| 2004/0181679 A1* | 9/2004 | Dettinger et al. | 713/193 |
| 2004/0236958 A1 | 11/2004 | Teicher et al. | |
| 2005/0138468 A1 | 6/2005 | Asare et al. | |
| 2005/0216685 A1 | 9/2005 | Heden et al. | |
| 2005/0228994 A1 | 10/2005 | Kasai et al. | |

FOREIGN PATENT DOCUMENTS

WO  WO01/13293 A1  2/2001
WO  WO2005/091149 A1  9/2005

OTHER PUBLICATIONS

Coombs, Jason. "Detecting Man in the Middle Attacks with DNS". Dr. Dobb's Journal. Dec. 18, 2003. Available at http://www.ddj.com/article/printableArticle.jhtml?articleID=184416896&dept_url=/windows/. Downloaded Jul. 1, 2009.*
University of Delaware. "Encrypt Your Sensitive Data: Back up and Restore". Aug. 17, 2005. Available at http://www.udel.edu/topics/encryption/backupwin.html. Downloaded Jun. 30, 2009.*

(Continued)

*Primary Examiner* — Nasser Moazzami
*Assistant Examiner* — Travis Pogmore
(74) *Attorney, Agent, or Firm* — Workman Nydegger

(57) ABSTRACT

Accessing a data set with secret and non-secret data. A method includes accessing a data set image. The data set image comprises secret data. The data set image is derived from an authorized data set associated with a master key that authorizes access to the secret data. The master key is not provided with the data set image. The method further comprises restoring the data set image to a computing system to create a degraded data set. Data in the degraded data set other than the secret data is accessed without restoring the master key.

16 Claims, 4 Drawing Sheets

OTHER PUBLICATIONS

Bott, Ed. "Windows XP Backup Made Easy" Jul. 14, 2003. Available at http://www.microsoft.com/windowsxp/using/setup/learnmore/bott_03july14.mspx. Downloaded Dec. 16, 2009.*

"MCSE—EFS security". Oct. 20-21, 2003. Available at http://www.velocityreviews.com/forums/t47214-efs-security.html. Downloaded Dec. 16, 2009.*

Bott, Ed. Jun. 10, 2005. Available at http://www.edbott.com/weblog/archives/000770.html. Downloaded Dec 16, 2009.*

Team, The Microsoft Windows. Microsoft Windows XP Professional Resource Kit Second Edition. New York: Microsoft, 2003. Print. Selections downloaded from http://proquest.safaribooksonline.com/0735619743/ on Dec. 16, 2009.*

"MCSE—EFS security". Oct. 20-21, 2003. Available at http://www.velocityreviews.com/forums/t47214-efs-security.html. Downloaded Dec. 16, 2009.*

David Paul Maher "Crypto Backup and Key Escrow", pp. 48-53 Mar. 1996/vol. 39, No. 3 Communications of the ACM http://delivery.acm.org/10.1145/230000/227241/p48maher.pdf?key1=227241&key2=421522231&coll=GUIDE&dI=ACM&CFID=58469224&CFTOKEN=20171019.

M. Kaczmarksi, T. Jiang and D.A. Pease "Beyond backup toward storage management", pp. 1-16 IBM Systems Journal, vol. 42, No. 2, 2003 http://www.tectrade.co.uk/data/TIV%20WP%20t4.pdf.

S.M. Matyas and C.H. Meyer "Generation, distribution, and installation of cryptographic keys", pp. 126-137 Copyright 1978, IBM Syst J. vol. 17 No. 2 1978. http://www.research.ibm.com/journal/sj/172/ibmsj1702D.pdf.

* cited by examiner

SECURING DATA SET IMAGES

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computer systems often make use of a data set that stores information for use by application programs running on the computer system. It is often desirable to perform various data operations on the data set as a whole. For example, it may be desirable to back up the entire data set as a backup image. This backup image can be used to restore the data set in case of failure or corruption. The backup image may also be used to create a clone of a system with the data set. In the clone example, it may be desirable to have computer systems distributed throughout an enterprise network where the computer systems provide the same or similar services. Each of these computer systems may act as a distributed service providing services to clients in close proximity to the distributed service.

One challenge that arises with backed up data set images relates to security concerns. One concern is that if the backed up image of the data set falls into the wrong hands, an enterprise network may be compromised when an unauthorized user gains possession of the backed up data set image and thus is able to create a distributed service on the enterprise network that may be able to maliciously steal, compromise or corrupt data on the enterprise network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced, for example, in a computing environment including a computing system. The method includes acts for accessing data. The method includes accessing a data set image. The data set image comprises secret data. The data set image is derived from an authorized data set associated with a master key that authorizes access to the secret data. The master key is not provided with the data set image. The method further comprises restoring the data set image to the computing system to create a degraded data set. Data in the degraded data set other than the secret data is accessed without restoring the master key.

Another embodiment includes yet another method that may be practiced, for example, in a computing environment including a computing system that comprises an authorized data set. The method includes acts for accessing data and protecting secret data. The method accessing the authorized data set. The authorized data set includes secret data. Access to the secret data is controlled by a master key at the computing system. The master key is removed from the computing system to create a degraded data set from the authorized data set where the secret data is not accessible from the degraded data set. The method further includes accessing data in the degraded data set other than the secret data without restoring the key to the computing system.

Another method may be practiced in a computing environment including a computing system that comprises an authorized data set. The method includes acts for providing data in the data set to another computing system and protecting secret. data. The method includes accessing the authorized data set. The authorized data set includes secret data. Access to the secret data is controlled by a master key at the computing system. A backup image is created where the master key is not included with the backup image to create a degraded data set from the authorized data set. The secret data is not accessible from the degraded data set. The method further includes transmitting the backup image to a second computing system capable of accessing data from the degraded data set other than the secret data without having first stored the master key.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment described herein illustrates an example of a data set that includes secret data. The data set may also include non-secret data. The secret data has an associated master key that allows the secret data to be accessible. In one embodiment, the master key may belong to a hierarchy of keys where the master key controls access to a list of lower keys where the lower level keys permit access to different portions of the secret data. In one embodiment, a backup image of the data set may be created where the master key is removed from the data set before the image is created. The image can then be transferred to a new location or system by any appropriate transmission path. Exemplary transmission paths include transmission over a network connection, storage of the data on a physical media such as a CD, DVD or removable hard drive and delivery by courier of the physical media, or any other appropriate path. Once the image is received at the new location or new system, the image can be restored on the new system. In one embodiment, the image is restored with the expectation that the master key may never be restored. In this case, the secret data is not accessible. The data is not accessible in the sense that it cannot be read in an unencrypted form without the master key. However, any non-secret data continues to be accessible by the system on which the image was restored.

In an alternative embodiment, the image may be received at a new system through the first transmission path previously discussed with the expectation that the master key will be received on an alternate second transmission path. By the image being transmitted on the first transmission path and the master key being transmitted on a second transmission path, an additional layer of security is achieved as either the image or the master key may be compromised without compromising the secret data. In this embodiment, the image may be nonetheless restored without the master key being restored. The non-secret data will continue to be accessible to the system on which the image was restored. However the secret data will not be available to the system until the master key is restored.

The embodiments described previously may be embodied on a system that includes functionality for a operating in a degraded state where the non-secret data is available from a restored image even when a master key has not been restored with the image. In one embodiment, network connections and systems may be designed to support different levels of trust.

Figure 1:
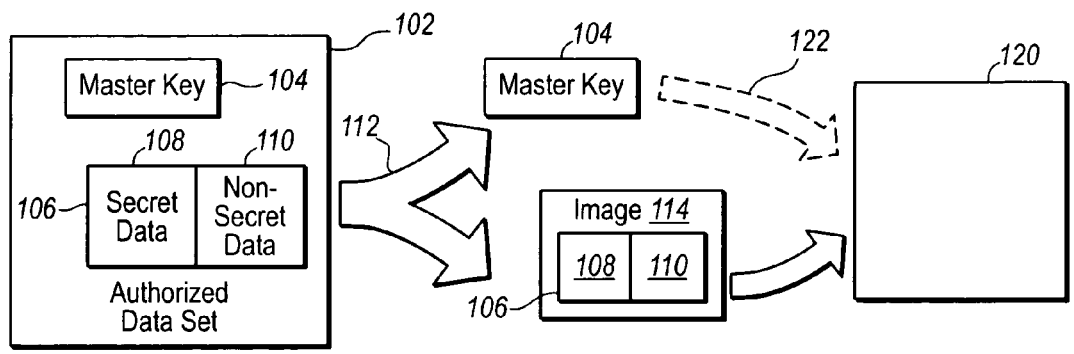
FIG. 1 illustrates creating a data set image for transmission to a computer system.

Referring now to FIG. 1, an exemplary embodiment is illustrated. FIG. 1 illustrates a fully authorized data set 102 which includes a master key 104 and a data set 106. The data set 106, in this example, includes both secret data 108 and non-secret data 110. In the example shown in FIG. 1, the master key 104 may be separated out of the authorized data set 102 as illustrated by the forked arrow 112. This operation creates a master key 104 that is separate from an image 114 that includes the data set 106 including the secret data 108 and non-secret data 110. In the example shown in FIG. 1, the image 114 may be transmitted on a first path 118. The image 114 may be transmitted to a new system 120 where the image 114 may be restored so as to replicate the data set 106 on the new machine 120. Once the image 114 has been restored on the new machine 120, the new machine 120 may access any of the non-secret data 110. However, the secret data 108 remains inaccessible by the new machine 120.

As illustrated in FIG. 1, the master key 104 may optionally be transmitted on a second data path 122 that is separate and distinct from the first data path 118. Thus, while the first path 118 and the second data path 122 may be a similar or same type of path, i.e. both physical media or network media, they are nonetheless separate and distinct from each other. For example, the first data path 118 may include transportation on a physical media such as a CD, DVD, removable hard drive, flash drive and the like while the second data path 122 includes transportation on a different physical media including any one or more of a CD, DVD, removable hard drive, flash drive and the like. Alternatively, one path may be a physical path while the other path is a network path. Other combinations are possible, as well, though not enumerated here.

In one embodiment, different factors can be evaluated to determine on which path the image 114 and the master key 104 will be transmitted. For example, the master key 104 is relatively small in size compared to the image 114. Thus the master key 104 can be transmitted on a highly secure bandwidth limited connection. Nonetheless, no matter what path is used to transmit the image 114, the secret data 108 in the image 114 will still be protected at least the same security level as the security level of the path used to transmit the master key 104 because the secret data 108 in the image 114 is unreadable without the master key 104. The image 114 can then be sent on a less than optimal data path. For example, the image 114 may be sent on a data path that is low cost, less secure, asynchronous etc. Such a path may have a higher bandwidth to allow the data image 114 to be transmitted more easily to the new machine 120.

As noted previously, transmission of the master key 104 on the second path 120 may be completely optional as indicated by the broken lines illustrating the second path 122. For example, some embodiments may provide for functionality that allows a clone of the system originally including the authorized data set 102 where the clone has a reduced functionality such that only the non-secret data 110 of the data set 106 is available to the clone which may be for example the new system 120. For example, an enterprise may include a number of branch offices for which the enterprise desires to give access to the data on the data set 106 but in a reduced fashion. For example, each of the branch offices on an enterprise network may have need to view certain parts of the data in the data set 106, but for security or other reasons should be restricted from reviewing data that concerns the enterprise as a whole where that data may be included in the secret data 108. Thus, an enterprise network can distribute data in the data set 106 without performing post processing to remove the secret data 108 to branch offices in the enterprise network by sending the image 114 without the master key 104. In this fashion, the branch offices will have access to the non-secret data 110 but will not be able to access the secret data 108.

Notably, one alternative embodiment may be configured to detect the loss of the image 114. For example, a system may be able to determine that the image 114 has been intercepted by an unintended recipient of the image 114. If it is determined that the image 114 has been intercepted by an unintended recipient of the image 114, the system may be able include functionality for revoking any privileges for machines restoring the image 114. Additionally, the system may include functionality for determining the scope of any damage caused by the interception of the image 114. For example, the system may be able to indicate that the amount of damage caused by the interception of the image 114 is limited to damage caused by the loss of any non-secret data 110.

Figure 2:
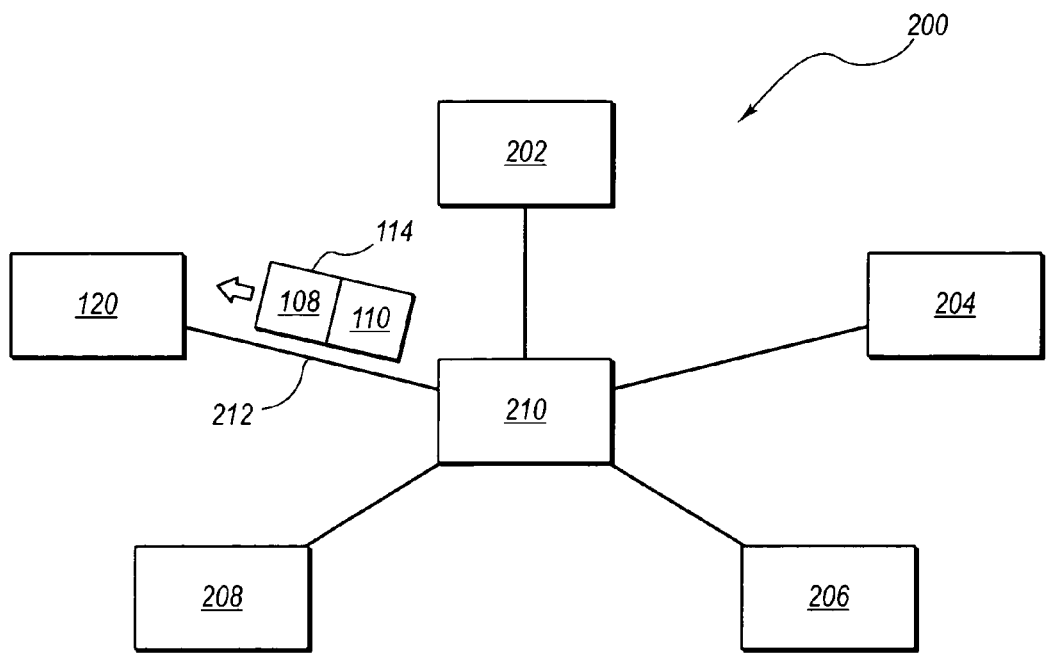
FIG. 2 illustrates a distributed computing environment.

Referring now to FIG. 2 an exemplary embodiment is illustrated where various features are shown in the context of a distributed network environment 200. The distributed network environment 200 may include a number of distributed services 202 through 210. The distributed services 202 through 210 may provide various services to clients in the distributed network environment 200. In one embodiment, some of the distributed services 202 through 210 may provide the same services to different sets of localized clients. Other services such as for example distributed service 210 may include centralized functionality where the centralized functionality includes services and data available at the other distributed services 202 through 208. In one particular embodiment, the centralized distributed service 210 includes data and functionality for all of the other distributed services 202 through 208 irregardless of their varying functionality.

It may be desirable to add additional distributed services to the distributed network environment 200. However, it may be desirable to add additional distributed services that are lower in functionality than the centralized distributed service 210. Nonetheless, distributed service 210 may create a twin of the distributed service 210 albeit with reduced functionality. This may be accomplished in one embodiment by sending an image 114 without a master key 104 that controls access to secret data 108 in the image 114. In this fashion, the distributed service 210 does not need to remove secret data, but can rather send an entire back up the image 114 of the services at the distributed service 210 to a new machine 120.

At the new machine 120, the image 114 can be restored. However, any secret data 108 controlled by the missing master key 104 will not be available to the new machine 120. Thus, by causing the secret data 108 to include data that should not be provided by the new distributed service added to the distributed network environments 200, the distributed service 210 can facilitate the creation of a new distributed service at the new machine 120 without an undue amount of culling of the data in the image 114.

Notably, varying levels of keys may be used. For example, the distributed service 210 may send the image 114 on a first path 212 while providing one or more master keys to the new machine 120 via different paths. The one or more master keys may be used to unlock data needed for the new machine 120 to provide the services intended by the addition of a new distributed service. Additionally in one alternative embodiment, different master keys may be available to be provided to the new machine 120 depending on the intended functionality of the new machine 120. For example, one master key may unlock a set of keys needed to access data for providing a file service. A different master key may unlock a set of keys and needed to provide a print service. The distributed service 210 can provide the master key to the new machine 120 to allow for unlocking of any data needed to provide the service intended by adding the new machine 120 as a new distributed service.

As alluded to above, some embodiments include functionality for detecting the loss of an image 114 to an unintended recipient. For example, the distributed service 210 may be able to detect that the image 114 has been lost to a rogue machine. The distributed service 210 can then prevent the rogue machine from registering with the distributed network 200 to prevent unauthorized access to network resources and data. Additionally, by having knowledge of what data is secret data 108 and what data is non-secret data 110 in the image 114, the distributed service 210 can provide an indication of the damage done by the interception of the image 114.

Figure 3:
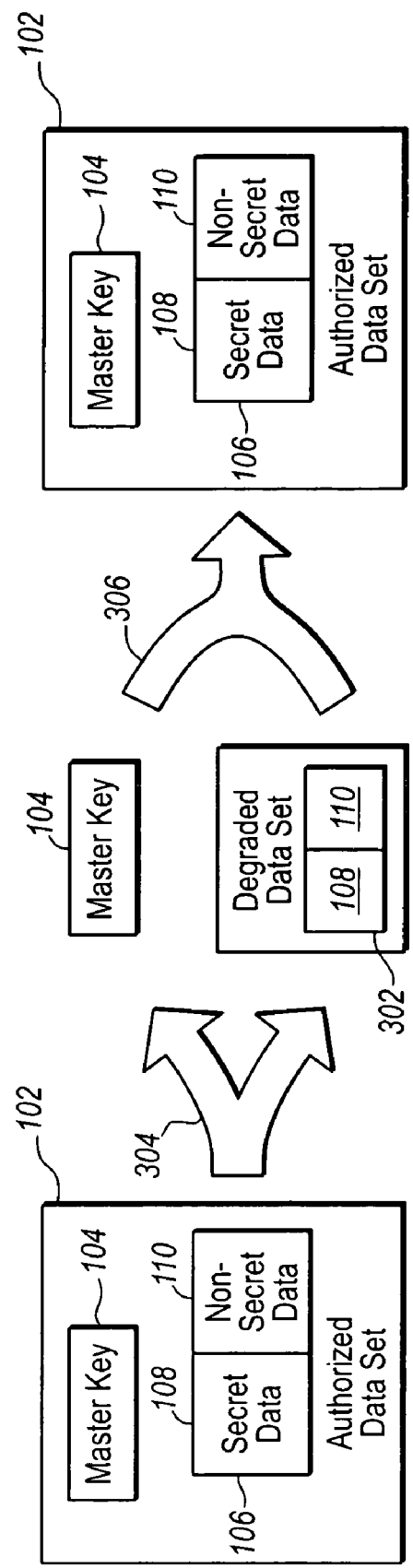
FIG. 3 illustrates separating a master key from a data set and restoring the master key to the data set.

The embodiments described above have been generally directed to embodiments where an image 114 is transferred to a computer system and restored to the computer system. However, embodiments may also include removing a master key from a system to protect secret data and restoring the master key to again allow access to the secret data. Referring now to FIG. 3 an illustrative embodiment is shown. FIG. 3 illustrates the authorized data set 102. As described previously, the authorized data set 102 includes a data set 106 including secret data 108 and non-secret data 110. As shown in FIG. 3, the master key 104 may be removed as illustrated by the arrow 304 to create a degraded data set 302. The degraded data set 302 may nonetheless be functional in that the non-secret data 110 continues to be accessible. Thus, the degraded data set 302 remains functional while protecting the secret data 108 from unauthorized access.

This embodiment may be useful when transporting a server or other computer system from one physical location to another physical location. To prepare the system for transport, the master key 104 may be removed such that if the computer system becomes lost in transport, the secret data 108 will not be compromised. The computer system can nonetheless continue to be utilized with the degraded data set 302 before it is physically transported and after it is physically transported. The computer system can return to full functionality by having the master key 104 restored as illustrated by the arrow labeled 306 in FIG. 3.

Figure 4:
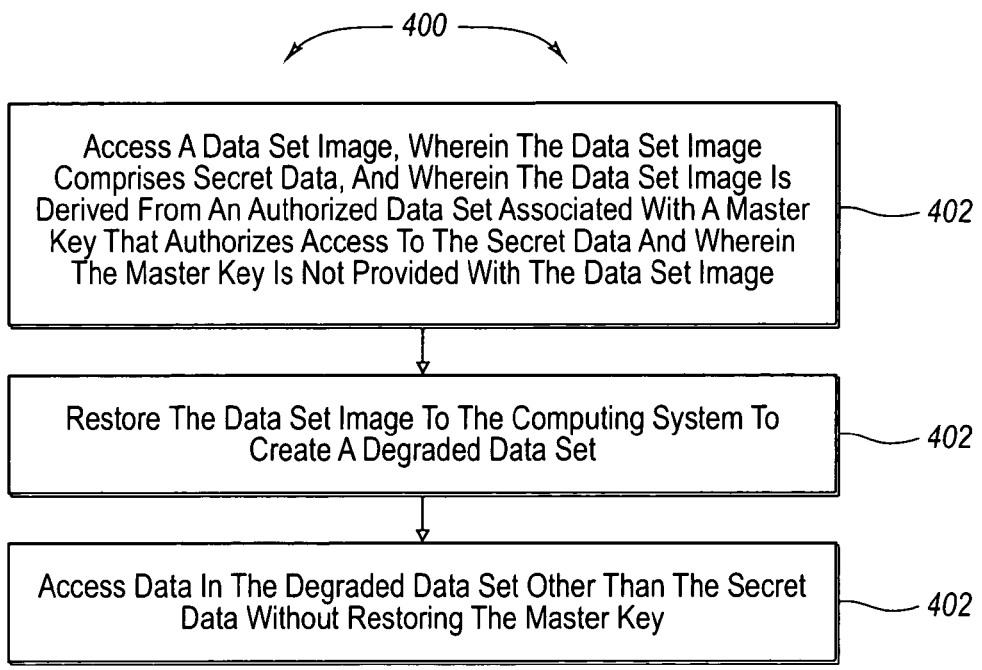
FIG. 4 illustrates a method of accessing data in a data set.

One embodiment, as illustrated in FIG. 4, is directed to method of accessing data. The method may be practiced, for example, in a computing environment including a computing system. The method includes accessing a data set image (act 402). The data set image includes secret data. The data set image is derived from an authorized data set associated with a master key. The master key authorizes access to the secret data. The master key is not provided with the data set image. Referring again to FIG. 1, an example of the act 402 of method 400 is lustrated. A new machine 120 receives an image 114 were the image includes a data set 106 including secret data 108 and non-secret data 110. As a illustrated in FIG. 1, a master key 104 has been removed from an authorized data set 102 such that the master key 104 is not included in the image 114. The data set, in one embodiment may be a database.

In one embodiment, the master key may control access to a master list of keys included in the data set image. The keys in the master list control direct access to data in the authorized data set. Thus, in one embodiment, the master key may be part of a hierarchy of keys. In another similar embodiment, different master keys may control access to different sets of secret data. Thus a master key may be provided for one set of secret data, while one or more other master keys are not provided for other secret data.

The method 400 further includes restoring the data set image to the computing system to create a degraded data set (act 404). Referring now to FIG. 1, degraded data sets may be installed on the new machine 120. This degraded data set may be the result of having restored the image 114.

The method 400 additionally includes an act of accessing data in the degraded data set other than the secret data without restoring the master key (act 406). The degraded data set on the new machine 120 may be accessed such that the non-secret data 110 may be accessed while the secret data 108 in his inaccessible due to the removal of the master key 104 before creating the image 114.

The method 400 may further include receiving the data set image at the computing system through a first path prior to accessing the data set image. Referring once again to FIG. 1, a first path is illustrated by the arrow labeled 118. The fist path may include a physical medium as a CD, DVD, hard drive, and/or flash memory. In an alternative embodiment, the first path may include a networked medium. As explained previously, because the master key 104 has been removed, the image 114 may be transmitted on a path, including physical media and/or network media, that has less than optimal security while not compromising the security of the secret data 108 in the image 114. Notably, the image 114 may include a range in size that includes very large images. Thus a high bandwidth path may often be desirable for implementing the first path.

In one embodiment, receiving the data set image may include receiving a back-up image of an existing data set. For example, the data set image 114 may be a backup image created to back up the data on the authorized data set 102. Notably, various embodiments may function such that irrespective of the backup method or vendor of backup software used, secret data in the data set 106 may nonetheless be protected and restored. Thus, the embodiments described herein are not necessarily dependent on a specific method of creating the image 114, and as previously mentioned, any appropriate method of backing up data to an image may be used to create the image 114.

The method 400 may further include receiving the master key through a second path, where the second path is distinct from the first path. Referring now to FIG. 1, while the first 118 and second paths 122 may be of similar types, such as both network paths or both physical media paths, the first 118 and second paths 122 should nonetheless be separate and distinct. This is done to maintain appropriate security. Using this arrangement, an image 114 can be sent on a first path 118 while the master key 104 is sent on a separate and distinct second path 122 so as to maintain the security of the secret data 108 at the same security level that exists on the second path 122.

The method 400 may further include an act of restoring the master key to the degraded data set to restore the authorized data set. For example, and referring again to FIG. 1, the master key 104 may be restored to the new machine 120. Once the master key 104 is restored to the new machine 120, the combination of the restored image 114 and restored master key 104 results in a restoration of the authorized data set 102 where the secret data 108 becomes accessible to the new machine 120.

The method 400 may further include an act of accessing secret data on the authorized data set at the computing system. As explained above with reference to FIG. 1, secret data 108 becomes accessible on the new machine 120 when the image 114 and master key 104 have both been restored on the new machine 120.

In one embodiment, restoring the data set image (act 404) and accessing the degraded data set (act 406) is performed without first post-processing to alter the data format of the data in the degraded data set. For example, as described above, any suitable method of backing up data to create an image 114 may be used. Beyond removing the master key 104, no special processing is required to format the image 114 in a format different than that created by the application used to create the back-up image.

As alluded to in the description of FIG. 2, the method 400 may be used to create a reduced functionality twin of a distributed resource on a network where the secret data is not available without the master key on the reduced functionality twin. For example, as illustrated in FIG. 2, a distributed service 210 may send an image 114 to a new machine 120 where the image 114 includes services of the distributed service 210. The distributed service 210 can keep a master key 104 that has been removed and not send the master key 104 to the new machine 120. This allows the new machine 122 to access non-secret data 110 but not to access the secret data 108. Thus the new machine 120, insofar as the non-secret data 110 allows, my function as a reduced functionality twin of the distributed service 210.

In one embodiment, the master key may control access to a master list of keys included in the data set image. The keys in the master list control direct access to data in the authorized data set.

Figure 5:
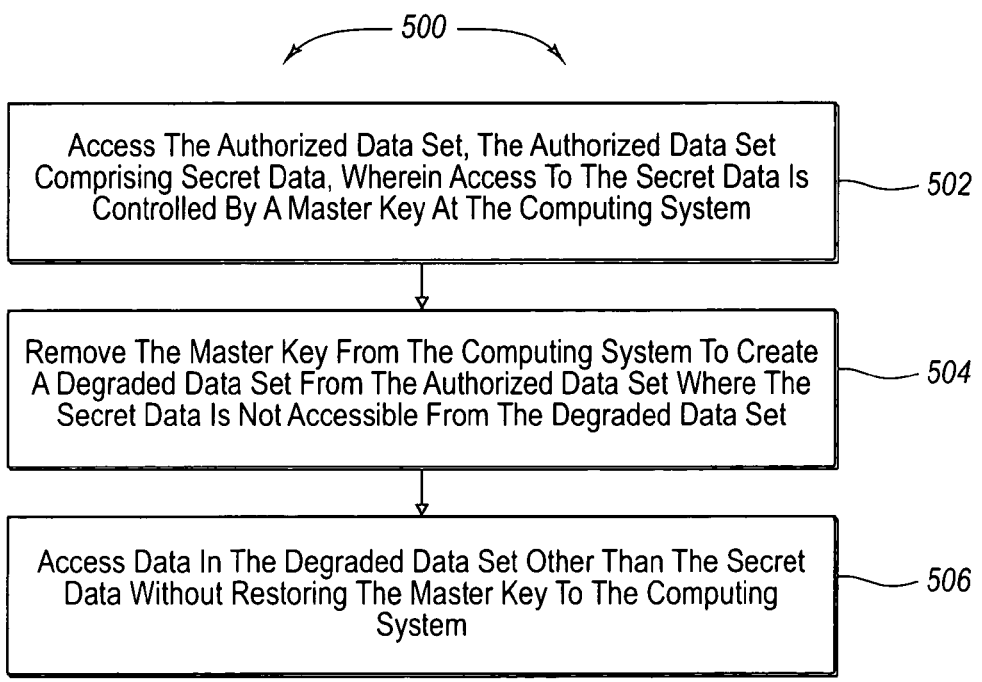
FIG. 5 illustrates a method of removing a master key to protect secret data and accessing non-secret data.

Referring now to FIG. 5, an exemplary method 500 of accessing data and protecting secret data is illustrated. The method may be practiced, for example, in a computing environment including a computing system that comprises an authorized data set. The method includes an act of accessing the authorized data set (act 502). The authorized data set includes secret data. Access to the secret data is controlled by a master key at the computing system. Thus, as illustrated in FIG. 3, an authorized data set 102 includes a data set 106 including secret data 108 and non-secret data 110. The master key 104 controls access to the secret data 108.

The method 500 further includes an act of removing the master key from the computing system (act 504) to create a degraded data set from the authorized data set where the secret data is not accessible from the degraded data set. As discussed previously and illustrated in FIG. 3, the master key 104 may be removed from the authorized data set 102 such that a degraded data set 302 is created. The degraded data set 302 includes both secret data 108 and non-secret data 110, however the secret data 108 is not accessible due to the absence of the master key 104.

The method 500 further includes an act of accessing data in the degraded data set other than the secret data without restoring the key to the computing system (act 506). Thus, as described previously herein, the removal of the master key 104 does not make the degraded day data set 302 completely inaccessible, but rather restricts access to the secret data 108 while allowing access to the non-secret data 110.

The method 500 may further include restoring the master key to the computing system to restore the authorized data set. For example as is illustrated in FIG. 3, the master key 104 may be restored to the computing system as illustrated by the arrow label 306 to restore the fully authorized data set 102. Once the fully authorized data set 102 has been restored, the method 500 may include an act of accessing secret data in the authorized data set.

The method 500 may further include an act of transporting the computing system on a first path to a location. The master key is transported on the second path to the location. The second path is distinct from the first path. In one embodiment, the second path is a more secure path than the first path. This allows the computer system to be transported in a less secure fashion while maintaining the computer system at a security level provided by the path used to transport the master key.

One embodiment includes functionality for implementing acts to detect that the master key has been compromised. For example, the master key may have been intercepted in transport by unauthorized users. An ability to view the secret data in the data set can then be revoked, even if the master key is restored. For example, the computer system can be prevented from accessing certain network resources, or other types of functionality may be revoked from the computer system.

Figure 6:
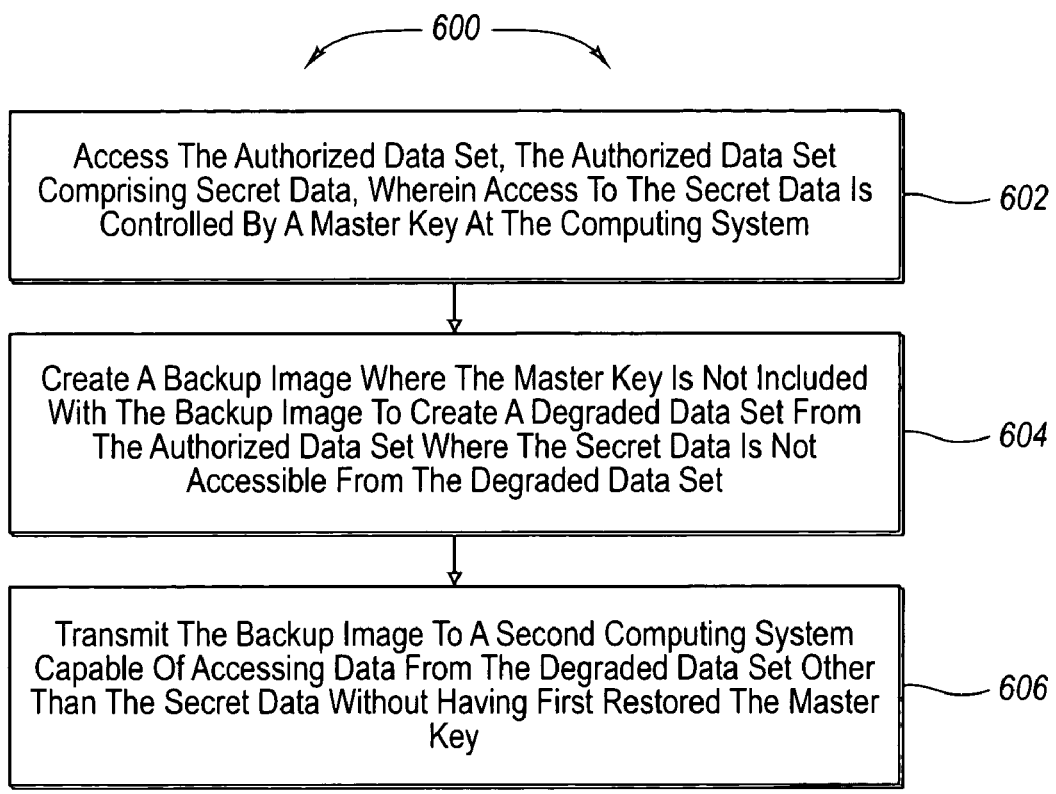
FIG. 6 illustrate a method of creating a backup image of a data set and transmitting the backup image to a new computing system.

Referring now to FIG. 6, yet another method 600 is illustrated. The method 600 may be practiced, for example, in a computing environment including a computing system that comprises an authorized data set. The method includes various acts for providing data in the data set to another computing system and protecting secret data. The method includes an act of accessing the authorized data set (act 602). The authorized data set includes secret data. Access to the secret data is controlled by a master key at the computing system.

The method 600 further includes an act of creating a backup image where the master key is not included with the backup image to create a degraded data set from the authorized data set (act 604). The secret data is not accessible from the degraded data set. The method 600 further includes an act of transmitting the backup image to a second computing system (act 606). The second computing system is capable of accessing data from the degraded data set other than the secret data without having first restored the master key. For example, and referring once again to FIG. 2, a distributed service 210 may transmit an image 114 that includes secret data 108 and non-secret data 110 created from a data set at the distributed service 210 to a new machine 120. The new machine 120 may be capable of accessing the non-secret data 110 while it is unable to access the secret data 108 without the master key retained by the distributed service 210. The computer systems and network shown in FIG. 2 may be specially designed, in one embodiment, to recognize different levels of data. For example the computer systems and network may be designed to recognize data that is accessible without the use of the master key 104 and maybe designed to recognize the existence of the secret data without the need to be able to access the secret data or in some embodiments to have meta data regarding the secret data.

The than 600 may further include determining that the back-up image was intercepted by an unintended recipient. For example, a malicious individual or system may be able to tap into the network or to steal physical media that contains the image 114 so as to divert the image to an unintended recipient. In one embodiment a computer system may be designed to detect that the image 114 has been diverted. In an alternative embodiment, a system may have functionality for receiving a user input indicating that the image 114 has been diverted. The method 600 may further include disabling a data set created from the backup image. For example and referring again to FIG. 2, the distributed service 210 may be able to alert the other distributed services 202 through 208 in the distributed network 200 that the image was intercepted. Any new distributed services created from the intercepted image 114 will be denied access to the distributed network 200. In one embodiment this may be accomplished by referencing a serial number assigned to the image 114.

In one embodiment, when the method 600 has detected the interception of the image 114, the method 600 may further provide an indication of the scope of damage resulting from the interception of the unintended recipient. For example, by knowing what data is stored as non-secret data 110, a system can provide an indication that the non-secret data 110 has been lost while the secret data associated with the master key should nonetheless be protected so long as the master key has not been compromised.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a computing system, in an enterprise comprising a plurality of branch offices, a method of accessing data, the method comprising one or more computer processors executing computer executable instructions, causing the one or more processors to perform the following:

accessing a data set image, wherein the data set image comprises secret data and non-secret data, and wherein the data set image is derived from an authorized data set associated with a master key that authorizes access to the secret data in the authorized data set, the authorized data set including the master key, and wherein the master key is removed from the authorized data to create the data set image and is not provided with the data set image;

restoring the data set image to the computing system to create a degraded data set on the computing system, wherein the degraded data set includes the secret data, and the non-secret data and wherein the non-secret data continues to be accessible by the computing system on which the data set image was restored, but wherein the secret data is not accessible to the computing system in a sense that the secret cannot be read in an unencrypted form without the master key;

accessing data in the degraded data set other than the secret data without restoring the master key, while being prevented from accessing secret data so long as the master key has not been restored; and creating a plurality of reduced functionality clones of a distributed resource on a network, for which the enterprise desires to give access to the data on the data set but in a reduced fashion to the plurality of branch offices, by restoring the data set without the master key at the plurality of branch offices, such that the reduced functionality clones comprise the degraded data set including the secret data, and the non-secret data and wherein the non-secret data continues to be accessible by the reduced functionality clones at which the data set image was restored, but wherein the secret data is not accessible by the reduced functionality clones in a sense that the secret data cannot be read in an unencrypted form without the master key.

2. The method of claim 1, further comprising receiving the data set image at the computing system through a first path prior to accessing the data set image.

3. The method of claim 2, wherein receiving the data set image comprises receiving the data set image on a physical medium including at least one of a CD, DVD, hard drive, or flash memory.

4. The method of claim 2, wherein receiving the data set image comprises receiving the data set image from a networked medium.

5. The method of claim 2, further comprising:
receiving the master key through a second path, wherein the second path is distinct from the first path, and wherein the second path is a highly secure bandwidth limited connection with respect to the first path;
restoring the master key to the degraded data set to restore the authorized data set, such that the master key is included in the restored authorized data set; and
accessing secret data on the authorized data set at the computing system.

6. The method of claim 2, wherein receiving the data set image comprises receiving a back-up image of an existing data set.

7. The method of claim 1, wherein restoring the data set image and accessing the degraded data set is performed without first post-processing to alter the data format of the data in the degraded data set.

8. The method of claim 1, wherein the data set is a database.

9. The method of claim 1, wherein the master key controls access to a master list of keys included in the data set image, wherein the keys in the master list control direct access to data in the authorized data set.

10. The method of claim 1, the data set image comprising other secret data wherein access to the other secret data is controlled by one or more other master keys.

11. In a computing environment including a computing system that comprises an authorized data set, in an enterprise comprising a plurality of branch offices, a method of accessing data and protecting secret data, the method comprising one or more computer processors executing computer executable instructions, causing the one or more processors to perform the following:
accessing the authorized data set, the authorized data set comprising secret data and non-secret data, wherein access to the secret data is controlled by a master key at the computing system, wherein the master key is included in the authorized data set;
removing the master key from the computing system and the data set to create a degraded data set from the authorized data set where the secret data is not accessible from the degraded data set, wherein the degraded data set includes the secret data, and the non-secret data and wherein the non-secret data continues to be accessible by the computing system, but wherein the secret data is not accessible to the computing system in a sense that the secret cannot be read in an unencrypted form without the master key;
accessing data in the degraded data set other than the secret data without restoring the master key to the computing system, while being prevented from accessing secret data so long as the master key has not been restored; and
creating a plurality of reduced functionality clones of a distributed resource on a network, for which the enterprise desires to give access to the data on the data set but in a reduced fashion to the plurality of branch offices, by restoring the data set without the master key at the plurality of branch offices, such that the reduced functionality clones comprise the degraded data set including the secret data, and the non-secret data and wherein the non-secret data continues to be accessible by the reduced functionality clones at which the data set image was restored, but wherein the secret data is not accessible by the reduced functionality clones in a sense that the secret data cannot be read in an unencrypted form without the master key.

12. The method of claim 11, further comprising:
restoring the master key to the computing system to restore the authorized data set; and
accessing secret data in the authorized data set.

13. The method of claim 12, further comprising:
transporting the computing system on a first path to a location; and
transporting the master key on a second path distinct from the first path to the location prior to restoring the master key to the computing system and to the data set.

14. The method of claim 13, wherein transporting the master key on a second path comprises transporting the master key on a more secure path than the first path.

15. In a computing environment including a computing system, in an enterprise comprising a plurality of branch offices, that comprises an authorized data set, a method of providing data in the data set to another computing system and protecting secret data, the method comprising one or more computer processors executing computer executable instructions, causing the one or more processors to perform the following:
accessing the authorized data set, the authorized data set comprising secret data and non-secret data, wherein access to the secret data is controlled by a master key at the computing system, wherein the master key is included in the authorized data set;
creating a backup image where the master key is not included with the backup image to create a degraded data set from the authorized data set where the secret data is not accessible from the degraded data set, wherein the degraded data set includes the secret data, and the non-secret data and wherein the non-secret data continues to be accessible by computing systems on which the data set image is restored, but wherein the secret data is not accessible to the computing system on which the data set image is restored in a sense that the secret cannot be read in an unencrypted form without the master key; and
transmitting the backup image to a second computing system capable of accessing data from the degraded data set other than the secret data without having first restored the master key, while being prevented from accessing secret data so long as the master key has not been restored; and
creating a plurality of reduced functionality clones of a distributed resource on a network, for which the enterprise desires to give access to the data on the data set but in a reduced fashion to the plurality of branch offices, by restoring the data set without the master key at the plurality of branch offices, such that the reduced functionality clones comprise the degraded data set including the secret data, and the non-secret data and wherein the non-secret data continues to be accessible by the reduced functionality clones at which the data set image was restored, but wherein the secret data is not accessible by the reduced functionality clones in a sense that the secret data cannot be read in an unencrypted form without the master key.

16. The method of claim 15, further comprising providing an indication of the scope of damage resulting from the interception of the unintended recipient.

* * * * *